Figure 1:
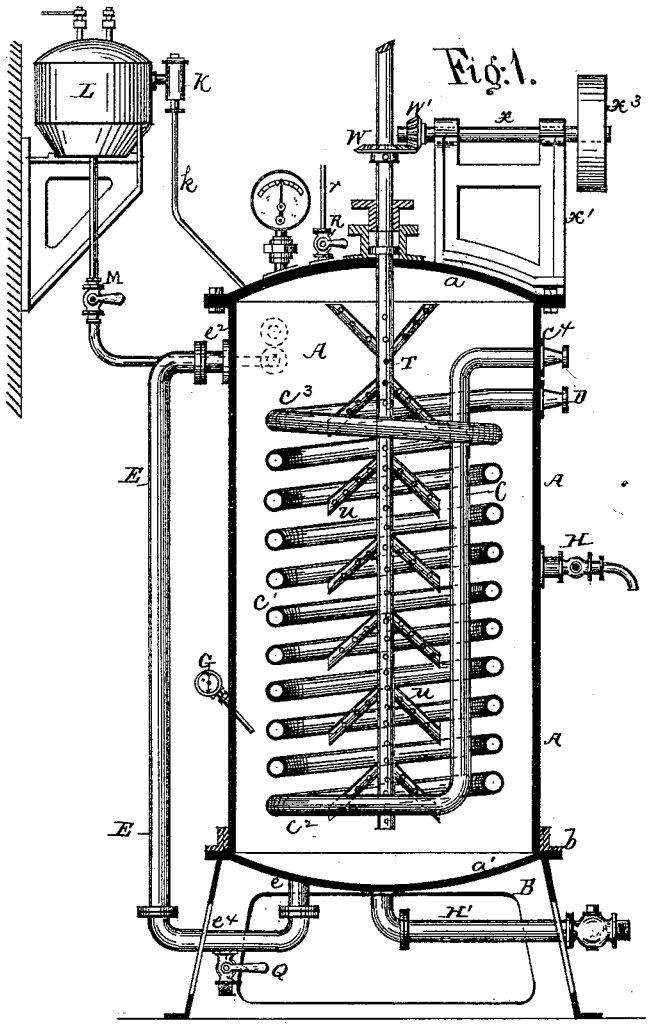
Figure 1:
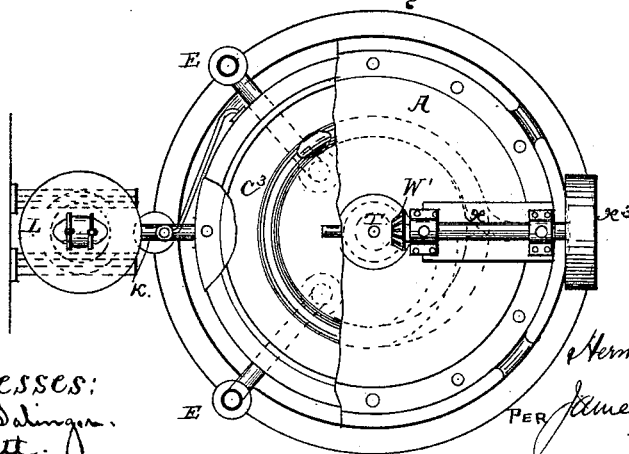

(No Model.)

H. SCHAARWÄCHTER.
PASTEURISING BEER, WINE, &c.

No. 388,153. Patented Aug. 21, 1888.

Fig. II.

Witnesses:
B. Arthur Dalinger.
F. Barrett.

Inventor:—
Hermann Schaarwächter.
PER James H. Lancaster.
ATT'Y.

UNITED STATES PATENT OFFICE.

HERMANN SCHAARWÄCHTER, OF BARMEN-RITTERSHAUSEN, PRUSSIA, GERMANY.

PASTEURIZING BEER, WINE, &c.

SPECIFICATION forming part of Letters Patent No. 388,153, dated August 21, 1888.

Application filed December 8, 1886. Serial No. 221,024. (No model.) Patented in Germany October 26, 1885, No. 36,841; in France April 10, 1886, No. 162,699; in England May 12, 1886, No. 6,401, and in Austria-Hungary October 19, 1886, No. 19,832.

*To all whom it may concern:*

Be it known that I, HERMANN SCHAARWÄCHTER, a subject of the Emperor of Germany, manager of the Barmer Actien Brauerei Schaarwächter, of Barmen-Rittershausen, in the Province of Rhenish Prussia and in the Empire of Germany, have invented certain new and useful Improvements in Pasteurizing Beer, Wine, and other Suitable Fluids, and Apparatus for the Same, (and for which I have obtained patents in Germany October 26, 1885, No. 36,841; in France April 10, 1886, No. 162,699; in England May 12, 1886, No. 6,401, and in Austria-Hungary October 19, 1886, No. 19,832;) and I do hereby declare that the following is a full, clear, and exact description thereof.

The object of my invention is to produce an apparatus for pasteurizing beer, wines, &c., which will improve the taste and durability of the said wines and beer.

Referring to the drawings, Figure I is a vertical sectional view of my improved apparatus. Fig. II is a plan view of the same.

A is cylindrical vessel, closed at both ends, $a\ a$. The upper cover, $a$, is detachable, and held to the cylinder by bolts. This cylinder should be made of sufficient strength to be capable of sustaining a pressure of at least one hundred pounds per square inch. This cylinder is supported on a pedestal, B, and screwed thereto by the angle-iron flanged ring $b$, shrunk onto the bottom of cylinder. At $c^4$ a pipe, C, enters the cylinder A, then descends vertically in the interior of the same to the bottom, and then rises in the spiral $c^2\ c^3$ to the top, and exits out of the said cylinder at D. This pipe C serves a twofold purpose: it is used to heat the fluid contained in the cylinder and also to cool it. When the fluid is required to be heated or pasteurized, a current of steam, hot water, or heated air is forced into and through the pipe C and spiral coils $c^2\ c^3$ until the fluid has received the necessary heat or pressure. When the fluid is required to be cooled quickly a current of cold water or cold air is forced through the pipe C and coil $c^2\ c^3$. The arrangement of the pipe C, as shown, increases the heating and cooling capacity of the same.

E E are circulating-tubes, starting from a point, $e$, of the vessel and entering the same at $e^2$. These tubes cause the beer to circulate within the vessel, which is very necessary, first, because it equalizes the temperature of the beer throughout its entire body; secondly, because it distributes equally the carbonic acid through the circulating beer or fluid. If this circulation did not take place in the vessel, the beer would not have an equal temperature, and consequently the carbonic acid contained in the beer would settle at the bottom of the vessel. Now, when the beer was drawn off from the vessel at various points, it would vary in quality, the beer coming out from the top being very poor in carbonic acid, that from the middle of a medium quality, and that from the bottom would give a quality very rich in carbonic acid. The cylinder is always filled absolutely full before heating begins. When the fluid or beer is heated, it expands. To relieve the cylinder of any extra pressure, I use a safety-valve, which may be of any construction and connected with the cylinder by a pipe, K. The other end of this valve is placed near the regulating-vessel L. When the safety-valve K opens, the volume of over-expanded beer rushes into the vessel L. From the bottom of this vessel L is a pipe, which leads into the cylinder A and provided with a cock, M. When the beer in the cylinder A has been cooled down, the escaped beer in the vessel L is then allowed to flow back into the said vessel A without any loss. To empty the cylinder A quickly, and also to introduce an additional supply of carbonic acid, I employ the inlet-pipe $r$, with cock R placed in the cover $a$. This pipe can be connected with any air-pump or carbonic-acid pump.

G are pressure-gages.

H is a trial-cock.

H' is a pipe with cock for drawing off the beer.

Q is a cock for drawing off the beer in elbow $e^4$ of pipe E.

By the above device I am enabled to give the beer a higher pressure and likewise equalize the distribution of carbonic acid and temperature throughout the whole vessel.

When the cylinder is emptied of the beer, it is advisable to thoroughly cleanse the same before using again. The usual mode was to remove the cover and pour water into the cylinder. I have invented a device by which the cylinder can be cleansed without removing the cover. It consists of a hollow shaft, T, which extends down into the interior of the cylinder nearly to the bottom thereof. This shaft is provided with arms or wings $u\ u$. These arms are perforated, and are placed on that portion of the shaft within the cylinder. This shaft is revolved by means of a bevel-wheel, W, on hollow shaft, and a bevel-wheel, W', on shaft X, supported on bracket-frame X', secured onto the top of cover $a$. The outer end of this shaft X is provided with driving-pulley $X^3$. The end of the hollow shaft T and arms $u\ u$ are closed, but their sides are perforated with small holes. Steam or hot water is forced into the hollow shaft. The shaft then revolves, and as it rotates the said steam or hot water passes out of the perforations in said shaft and wings and thoroughly washes the spiral $c'\ c^2$ and the interior of the cylinder.

I am aware that refrigerating machines having coils of pipe for conveying liquids of a heat-absorbing nature, thus cooling water that may be constantly thrown upon it, have heretofore been made; but it will be obvious to persons skilled in the art to which my invention appertains that the refrigerators heretofore known were not of the proper construction to perform all the functions for which my invention was intended.

Having thus described my invention, I desire to claim—

1. In an apparatus for pasteurizing beer, wine, &c., the combination consisting of the cylinder A, supported on bracket B, and containing the pipe $c'$, with coils $c^2\ c^3$, the pipe E, having one end thereof connected with the bottom of said cylinder A, the other end connected near the top thereof, the rotary cleansing-tube T, extending axially through the coil $c^2\ c^3$, the perforated arms $u$, connected with said rotary pipe T, and the gearing W W', and shaft X, adapted to operate the said tube T, substantially as shown and described.

2. The combination, in an apparatus for pasteurizing beer, wine, &c., of the regulating-vessel L, connected to cylinder A by pipe N, with cock M, and safety-valve K', connected with cylinder A, substantially as shown and described.

In testimony that I claim the foregoing I have hereunto set my hand this 18th day of September, 1886.

HERM. SCHAARWÄCHTER.

Witnesses:
 C. SIEPMANN,
 FR. SCHÜREN.